Oct. 10, 1939.   O. C. BETRY   2,175,738
FUEL VAPORIZER AND MIXER
Filed April 1, 1938
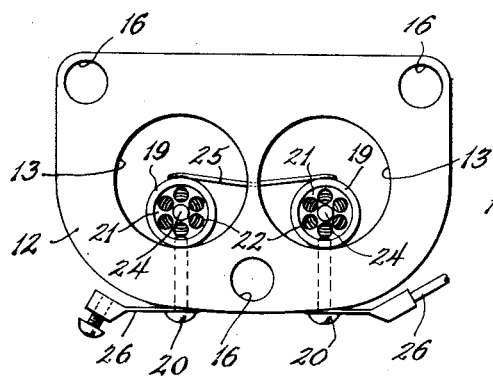
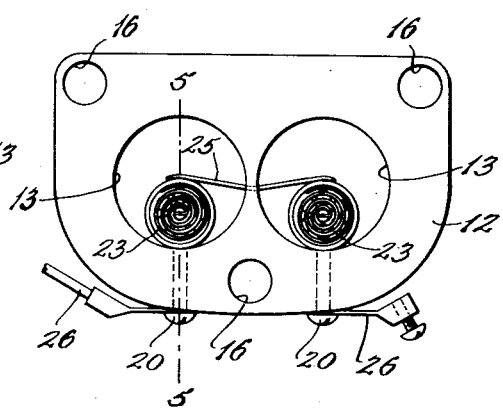
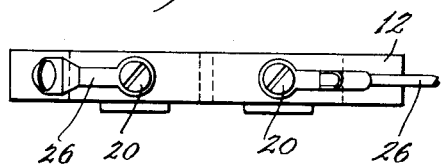
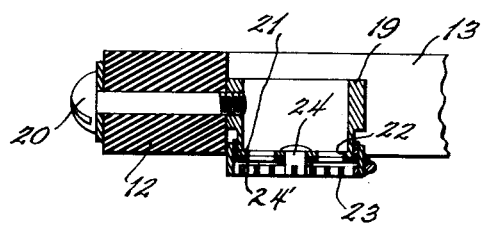
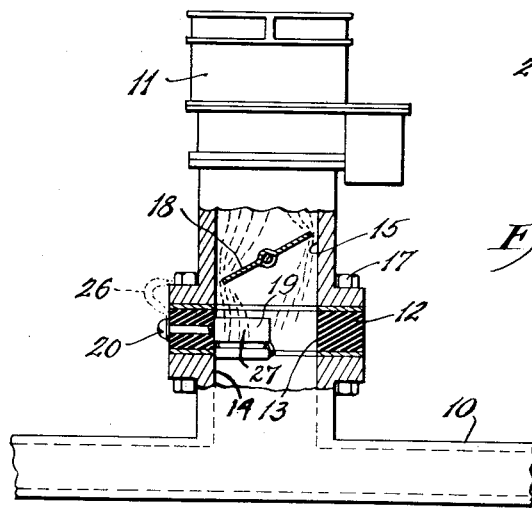
Inventor
Owen C. Betry
By Raymond Jones
Attorney Patented Oct. 10, 1939

2,175,738

UNITED STATES PATENT OFFICE 2,175,738

FUEL VAPORIZER AND MIXER

Owen Charles Betry, Glendale, Calif.

Application April 1, 1938, Serial No. 199,539

3 Claims. (Cl. 219—38)

My invention relates to a novel electric fuel vaporizer and mixer adapted for use in conjunction with internal combustion engines and has particular reference to a device which is designed to vaporize the gasoline contained in the gasoline-air mixture supplied by a carburetor and, further, to agitate the mixture prior to its passing into the intake manifold.

Heretofore, devices of this type have been objectionable either by virtue of their complexity or their tendency to impede the flow of the fuel mixture. Furthermore, such devices have failed to agitate the gasoline-air mixture and thereby carburete the fuel mixture.

The main object of my invention is to provide a means which is readily adapted for installation on existing engines in a manner to vaporize the gasoline contained in the gasoline-air fuel mixture obtained from a carburetor and, further, to agitate the mixture prior to its passing into the intake manifold.

Another object is to vaporize and mix the fuel mixture by means of a combined electrical heater and agitator without impeding the flow of the fuel mixture.

Another object is to provide an electrical fuel vaporizer and mixer capable of thoroughly vaporizing the incoming fuel mixture and thereby facilitating engine starting regardless of weather conditions.

A further object is to provide an attachment of the nature described that is efficient in operation, economical to manufacture, simple to install and which is automatic in operation.

For a full disclosure of the invention, reference is made to the accompanying drawing, wherein—

Figure 1 is a top plan view of the fuel vaporizer and mixing units;

Fig. 2 is a side view of the unit;

Fig. 3 is a plan view of the unit showing the lower side thereof and the heating elements;

Fig. 4 is a sectional view of the unit showing the unit as associated with the carburetor and intake manifold; and Fig. 5 is an enlarged sectional view on line 5—5 of Fig. 3.

Referring to the drawing in detail, the invention is shown as applied to duplex manifold 10 of a V-type motor which is provided with a carburetor 11 indicated in a conventional manner. The essential feature of my invention comprises a unit 12 formed of a non-conducting material such as fiber board or synthetic material which is adapted to be inserted between the intake manifold 10 and the base of the carburetor 11.

While the device is shown adapted for use with a duplex manifold and double inlet carburetor characteristic of V-type engines having opposed banks of cylinders, it may be used with equally good results in the straight line cylinder type of internal combustion engine.

Referring to Fig. 1, the vaporizing unit comprising a non-conducting block 12 is provided with a pair of circular vaporizing chambers 13 adapted to register with intake ports 14 of the manifold and the fuel supply conduits 15 of the carburetor. The unit is further provided with openings 16 adapted to receive bolts 17 which operate to secure the carburetor and the vaporizing unit to the manifold. When assembled, the fuel supply conduits 15 of the carburetor, the vaporizing chambers 13 of the vaporizing unit, and the intake ports 14 of the manifold form a continuous passage for conducting the gasoline-air fuel mixture from the carburetor 11 to the intake manifold 10. The supply conduits 15 are provided with butterfly valves 18 to control the flow of the fuel mixture therethrough.

The vaporizing chambers 13 of the vaporizing unit 12 are provided with cylindrical cups 19 which are secured to the side walls of the chambers by means of rivets or bolts 20 extending laterally through the vaporizing unit from the exterior. The cups 19 are provided at their lower ends with closure plates 21. Closure plates 21 are provided with a plurality of openings 22 at the outer edges thereof to permit the passage of the fuel mixture therethrough. Spiral electric heating coils 23 are mounted on the lower faces of the closure plates 21 and secured thereto by means of rivets 24. The cups 19 are insulated from the coils 23 by suitable insulation 24'. A lead 25 connects the heating coils 23 in series. The heating coils 23 are of the resistance type and are heated by an electric current supplied by a generator (not shown) through leads 26. The leads 26 are attached to bolts 20 which conduct the current to the cylindrical cups 19 and through the heating coils 23 mounted thereon. The connection of the heating coils 23 in series relation permits the use of any desired number of such units to obtain the results sought.

In the standard carburetor in use today, the control of the flow of the fuel mixture is obtained by means of a butterfly valve 18 as indicated in Figure 4. Such valves operate to pass a carbureted mixture of gasoline and air which flows in a relatively concentrated stream adjacent to one side of the intake passage. In the present invention, this stream of fuel mixture is still concentrated as it passes through the vaporizing chamber 13 of the vaporizing unit 12. The cylindrical cup 19 and the attached heating coil 23 are so positioned in the vaporizing chamber 13 as to intercept a portion of fuel mixture flowing therethrough. This location will be seen to be on that side of the intake passage adjacent the lower or depending edge of the butterfly valve as the same is opened and in the stream at 27 to permit the passage of the fuel mixture through the perforations 22 and coils 23.

In operation, a carbureted mixture of gasoline and air comprising the fuel mixture is fed from the carburetor 11 through the supply conduit 15. As the butterfly valve 18 is operated to control the volume of flow of the fuel mixture, the mixture passes the depending edge of the valve in a relatively concentrated stream. Upon entering the vaporizing chamber 13 of the vaporizing unit 12, a portion of the concentrated stream of carbureted gasoline and air is intercepted by the cylindrical cup 19 while the remaining portion passes through the chamber unimpeded. The intercepted portion of the fuel mixture passes through the openings 22 in the bottom 21 of the cylindrical cup 19. The fuel mixture is thereby subjected to a baffle action which tends to agitate the gasoline-air mixture and thoroughly mix the same. The agitated fuel mixture upon leaving the cylindrical cup 19 passes over the electric heating coils 23 which may be brought up to heat substantially instantaneously with the closure of the ignition switch and the operation of the generator. The heat supplied by the coils 23 heats and more thoroughly vaporizes the gasoline-air fuel mixture and thereby renders the condition of the fuel mixture most desirable for subsequent explosion in the engine. The intercepted portion of the fuel mixture after being subjected to baffle and vaporizing action of the cup 19 and the heater 23 is thereupon deflected by said cup and heater into the unimpeded portion of the fuel mixture passing through the intake passage.

The cylindrical cup 19 and heating coil 23 attached thereto are designed to occupy but a small portion of the cross section of the vaporizing chamber 13. It will therefore be obvious that the vaporizing unit operates to vaporize the fuel mixture and agitate the same to provide a more intimate mixture of gasoline and air. It will further be obvious that the desired result will be obtained with a minimum impedance of the flow of the fuel mixture through the intake passage.

I claim:

1. A combined fuel vaporizing and mixing unit comprising a block of electrical insulating material adapted to be secured in an operative position between a carburetor and an intake manifold, said block being provided within an opening therein for the passage of a concentrated stream of a fuel mixture therethrough to the manifold, a cup-shaped member secured to the side wall of the opening in said block adjacent the path of the concentrated stream of fuel mixture flowing therethrough, said member comprising a transverse bottom and a circular flange extending therefrom to form a wall portion, the bottom of said cup-shaped member being provided with a plurality of perforations to permit the passage of fuel mixture therethrough, a heating coil secured to the bottom of said cup-shaped member below said perforations, said flange and coil being positioned on opposite sides of the bottom and means associated with said block to supply an electric current to said heating coil.

2. A combined fuel vaporizing and mixing unit comprising a block of electrical insulating material adapted to be secured in an operative position between a carburetor and an intake manifold, said block being provided within an opening therein for the passage of a concentrated stream of a fuel mixture therethrough to the manifold, a cup-shaped member secured to the side wall of the opening in said block adjacent the path of the concentrated stream of fuel mixture flowing therethrough, the bottom of said cup-shaped member being provided with a plurality of perforations to permit the passage of fuel mixture therethrough, said cup-shaped member occupying less than one-half the cross sectional area of said opening whereby to intercept only a portion of the fuel mixture stream, the side wall of said cup-shaped member extending from the bottom thereof in a direction opposite to the flow of fuel from the carburetor, a heating coil secured to the bottom of said cup-shaped member and exteriorly thereof, and means associated with said block to supply an electric current to said heating coil.

3. In a device as set forth in claim 2, a butterfly valve positioned between the carburetor and the cup-shaped member and being rotatable to permit two streams of fuel gas to flow thereby, said cup-shaped member being secured within the opening in the block in position to intercept only one of said streams of gas.

OWEN CHARLES BETRY.